United States Patent Office 3,555,605
Patented Jan. 19, 1971

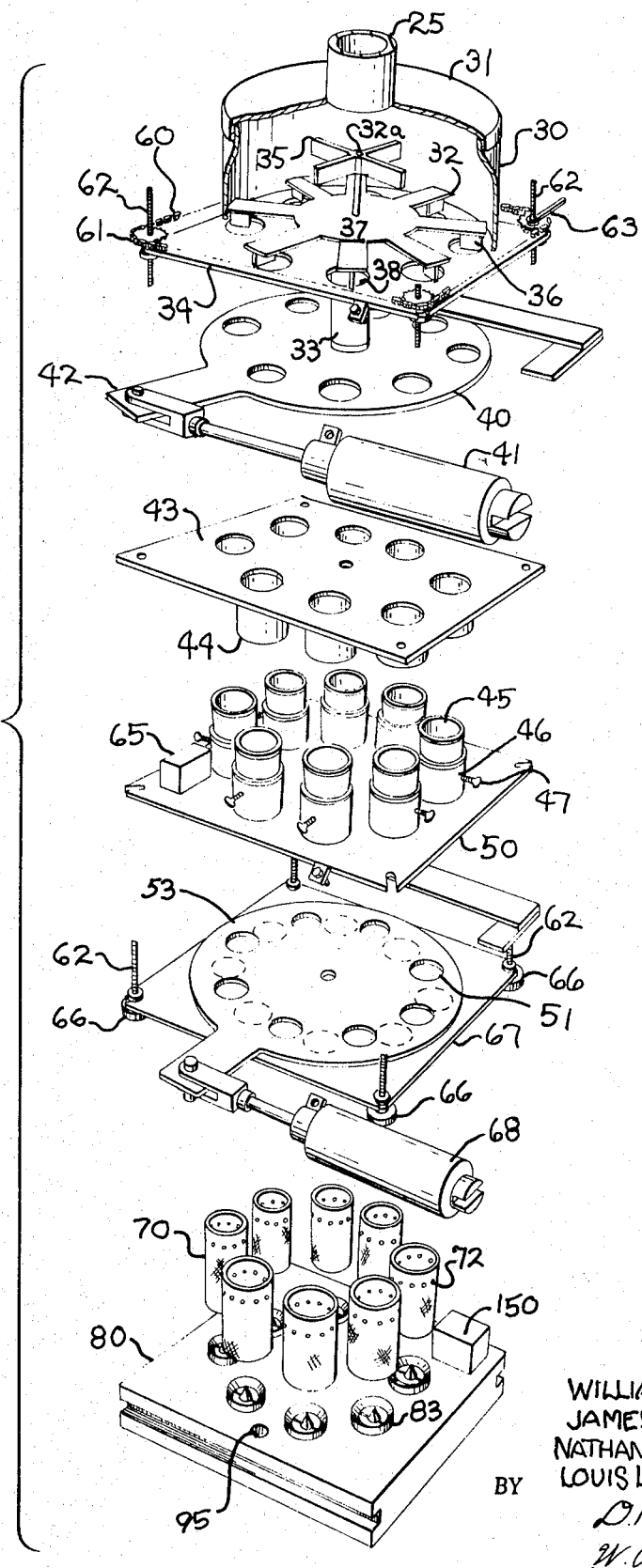

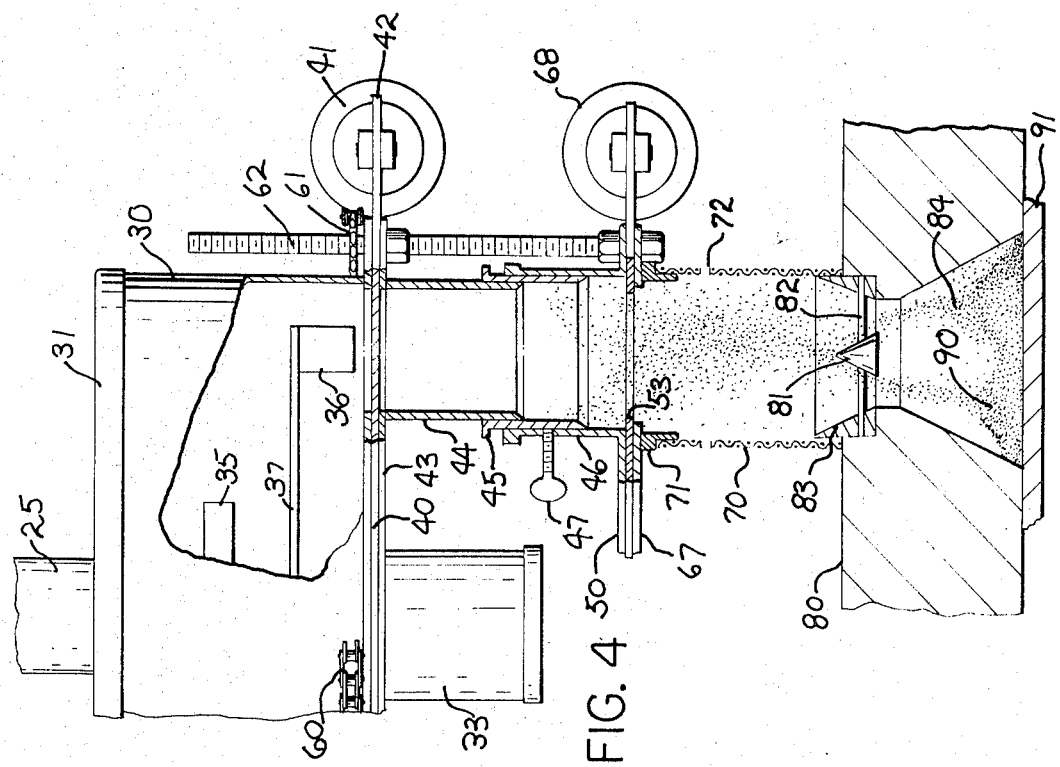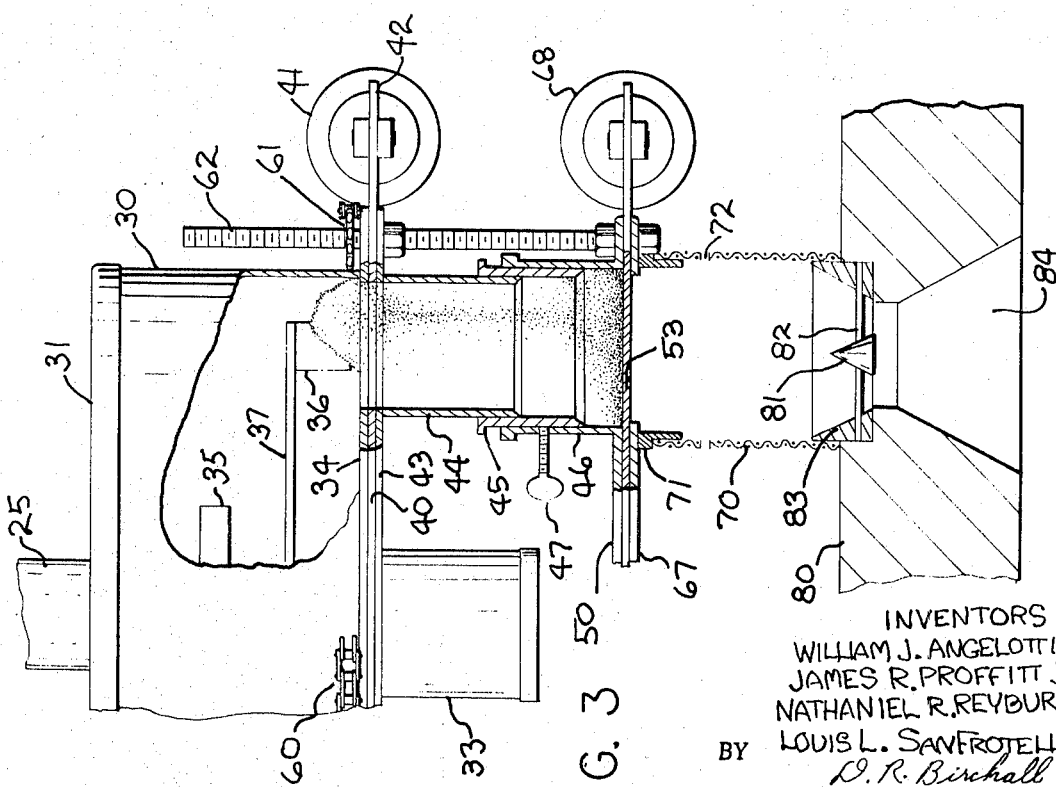

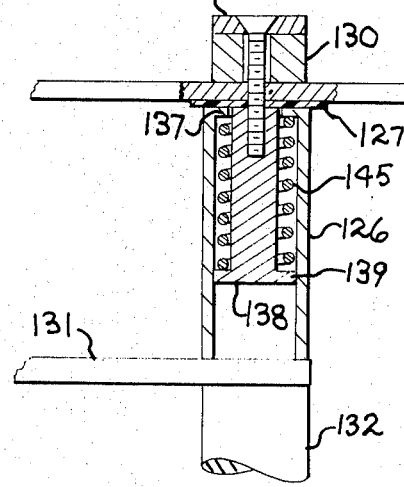
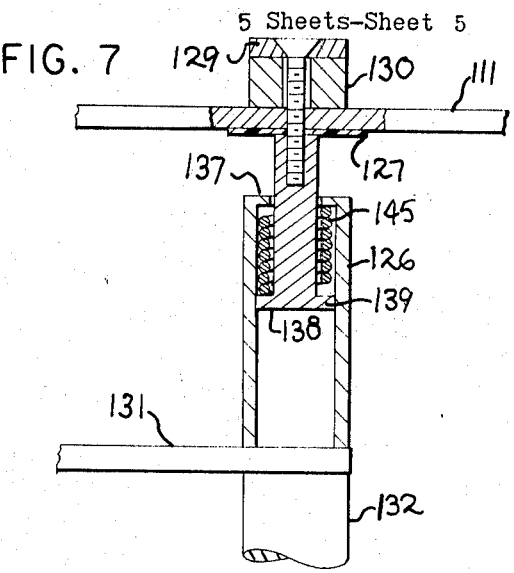
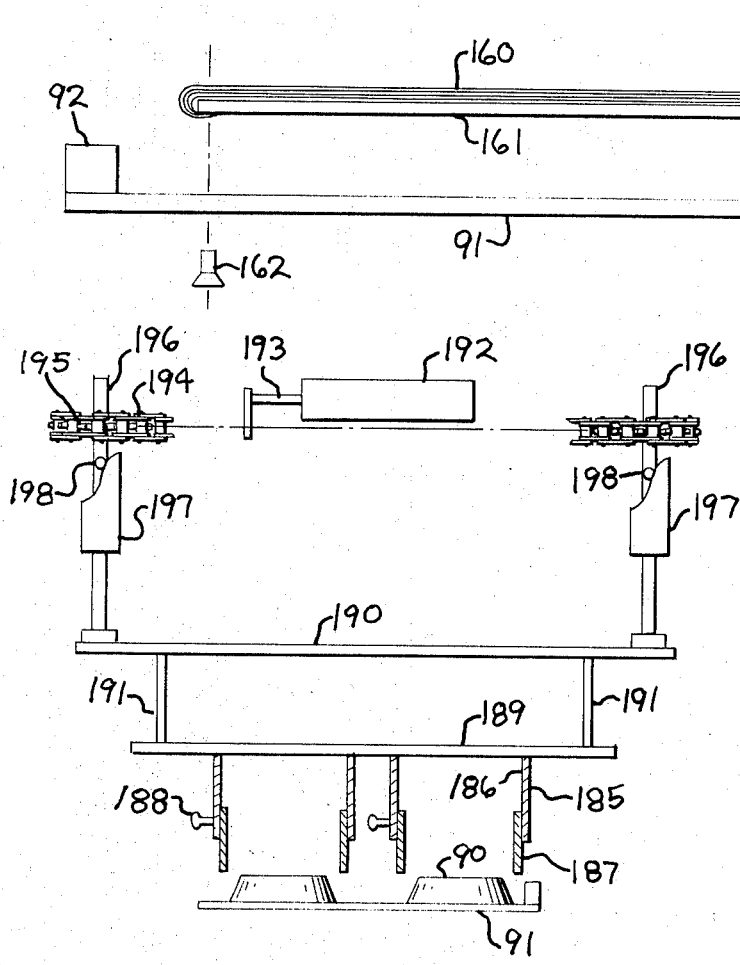

3,555,605
APPARATUS FOR COMPACTING PARTICULATE MATERIAL
William J. Angelotti, 4820 Roslindale 16509; James R. Proffitt, Jr., 3440 Breezeway 16506; Nathaniel R. Reyburn, 4810 Wolf Road 16505; and Louis L. San Frotello, 109 Elk St., all of Erie, Pa.
Filed Nov. 30, 1966, Ser. No. 598,064
Int. Cl. B30b *11/00, 15/30*
U.S. Cl. 18—16                                 5 Claims

ABSTRACT OF THE DISCLOSURE

An apparatus for volumetrically measuring and compacting a thermosetting plastic resin such as melamine. An apparatus employing a high frequency low amplitude vibration in a horizontal direction and a low frequency high amplitude vibration in a vertical direction to effect compaction of a melamine powder. A method of measuring a powdered melamine by a volumetric chamber, delivering the melamine to a vibration chamber so that it forms a specific configuration suitable for optimum compaction under biaxial vibration.

---

This invention relates to molding thermosetting plastics and, in particular, it relates to an innovation in the dispensing and compacting of a difficult-to-handle material such as powdered melamine.

THE PRIOR ART

A previously developed technique for molding dishes, cups, and similar articles from melamine resin has been accomplished through the use of melamine in granular form. The granular melamine is generally weighed by the use of scales and then introduced into a preform machine. By use of a preform machine, the granular melamine is compressed into small bricks known as pills. In order to meet the demand of presses in which melamine articles such as dishes are formed to their final configuration, it it necessary to maintain a stockpile of preformed pills. The stockpiled melamine pills must be stored in a separate enclosed room with a filtered atmosphere in order to protect them from foreign particles which if allowed to contaminate the melamine would result in blemishes in the finished ware. Then too exposure to different humidity conditions results in unpredictable and unexplainable production problems. By forming compacted melamine pille from granular resin before their ultimate use, they must be stored, which increases the overall space requirements of a given production facility. The use of pills formed from granular melamine resin results in preforming, scheduling and transportation to and from the storage area.

OBJECTS OF THE INVENTION

In recognition of the deficiencies of the previously developed methods and apparatus utilized in measuring and preforming a granular material, it is the primary object of the present invention to provide a new apparatus which enables powdered resins to be formed into suitable masses for easy handling and accessibility for immediate use in the production of pressed ware.

Another object of the present invention is to volumetrically measure and compact individual fine resin powder charges for efficient preheating and ease in handling, as an integral part of a molding operation.

A further object of the present invention is to provide an apparatus that volumetrically weighs a plurality of thermosetting resin charges and then compacts them by biaxial vibration.

An additional object of the present invention is to provide a particulate mass of resinous material with a uniform density throughout.

Yet another object of the present invention is to provide an apparatus for compacting a particulate material which is in the form of a very fine powder.

A further object of the present invention is to provide an apparatus for more even distribution of the heat within a mass of compacted plastic powder.

Additional objects of the present invention will become readily apparent when the contents of this specification are taken in conjunction with the drawings, which are by way of illustration and not limitation, and the appended claims attached hereto.

IN THE DRAWINGS

FIG. 2 is an exploded perspective view showing the delivery and volumetric measuring components;

FIG. 3 is a view, part in section, which shows particulate material entering the volumetric weighing chamber;

FIG. 4 is a view similar to FIG. 3 except that the weighted particulate material is entering the compaction chamber;

FIG. 6 is a cross-sectional detail of the spring assist used for vertical vibration;

FIG. 7 is a cross-sectional view similar to FIG. 6 except that the compacting base is raised to its fullest extent;

FIG. 8 is an exploded side view of the resin compacting tray; and

FIG. 9 is a schematic elevational view of a preheater modification.

Figure 1:
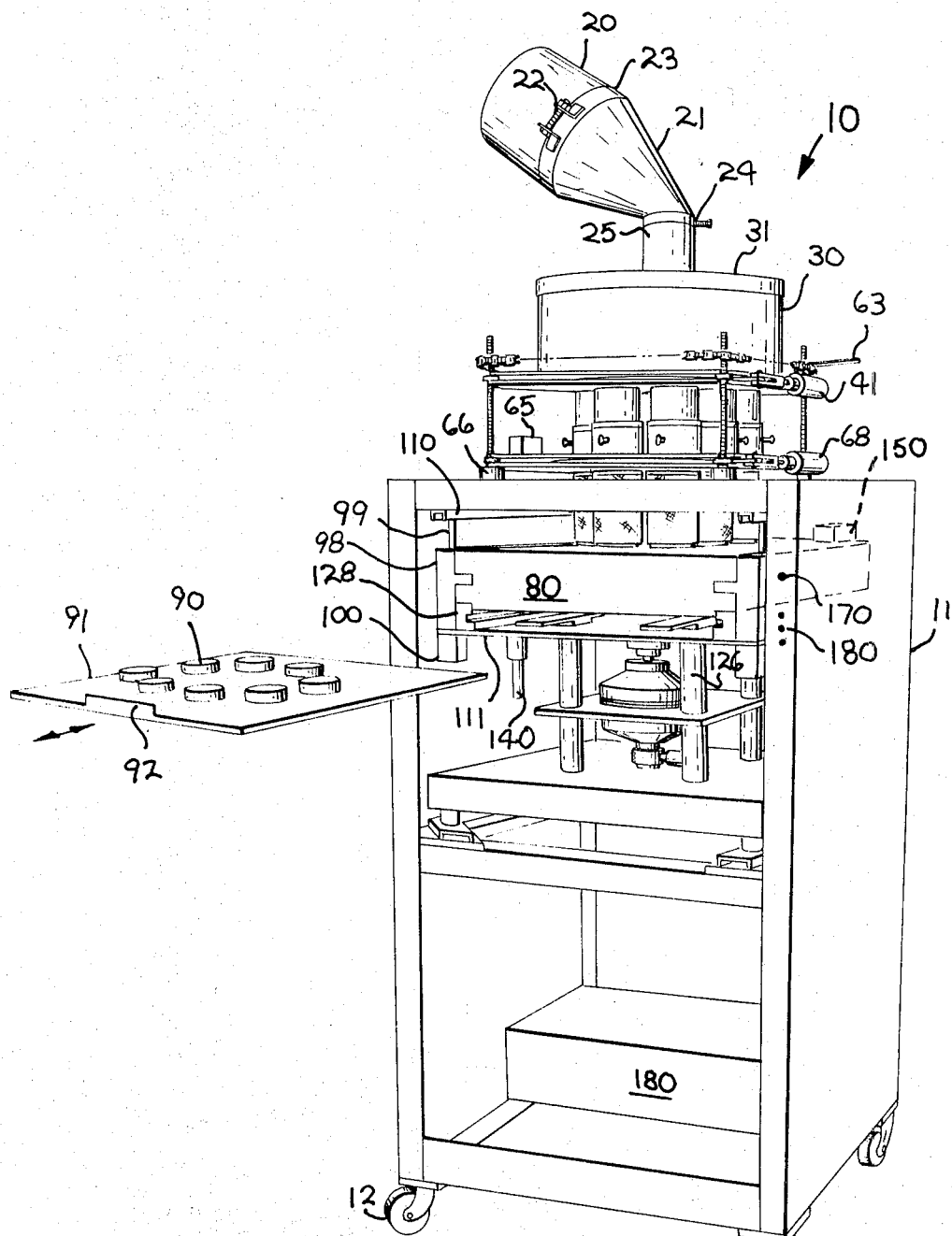
FIG. 1 is a perspective view of the resin powder measuring and compacting machine of the present invention.

Referring now to FIG. 1 which is a perspective view of the apparatus embodying the present invention, the overall apparatus is represented by numeral 10. Apparatus 10 is a cabinet-like construction and consists of an upright frame structure 11. Frame 11 can either be positioned on the floor or else can be mounted on casters 12 as shown in FIG. 1. Mounted within frame 11 and protruding from the top thereof is a measuring and vibrating assembly that can be best understood from a more detailed discussion of the parts contained therein.

Starting now with the very top of FIG. 1 and apparatus 10, there is shown a melamine powder drum 20 mounted at an angle of, for example, 60° with respect to a horizontal plane. The drum 20 is held in position by a drum top assembly 21 that is affixed to the top of the drum by any suitable clamping means as, for example, screw mechanism 22 positioned on clamp ring 23. The drum top assembly 21 is placed atop the drum after it has been tumbled along its major axis to aerate and agitate the resin powder thus returning it to a semi-free flowing state. Basically, fine powder melamine or other similar materials, such as flour, requires air intermixed between the particles to make it flow under the influence of gravity or other means. An iris flow valve 24 is located within the structure of drum top assembly 21 so that drum 20 may be raised into position atop apparatus 10 without undue powder being spilled therefrom. A tubular extension 25 permits the resin powder to flow from the drum into apparatus 10. The tubular extension as well as the parts of the top drum assembly are preferably made from stainless steel so that little or no oxidation will take place thereon. Previous experiences have shown that conventional materials, such as cold and hot rolled steel and aluminum, have surfaces sufficiently oxidized to permit the transfer of oxidized metal to the fine powder particles, thus causing dirt in the molded ware. Stainless steel also offers excellent moisture resistance to insure freedom from rust development during the summer and other periods of prolonged high humidity.

MEASURING THE POWDER CHARGE

The contents of drum 20 are fed into an annular-shaped hopper 30 which has a dust-tight top 31 affixed thereto. The hopper 30 and its associated parts can be more clearly seen in FIG. 2. During normal operation, hopper 30 is completely full of fine resin powder. In order to aid in the dispersion of the resin powder to all orifices leading downward from the hopper, an agitator 32 is mounted on a vertically extending shaft 32a which is mounted and powdered from a reversible motor 33. Motor 33 is attached to the bottom of the upper level support plate 34. Agitator 32 is comprised of two sets of paddles for optimum movement of the powdered resin contained in hopper 30. The top paddles 35 are horizontally displaced and act to agitate the fine powder at the hopper top inlet. This agitation maintains flow and distributes powder outwardly toward the area of the volumetric weighing tubes. Located below horizontal paddles 35 is a series of vertically aligned paddles 36 that are attached to the outermost ends of a spider-like mounting plate 37. The vertical paddles 36 assure an even flow of the powdered material into each individual volumetric weighing tube. The agitator also prevents bridging of the powder within the hopper by its oscillatory motion. The agitator 32 moves angularly in one direction through 90° then is reversed. In operation, three or four complete oscillations of the agitator 32 take place during each compaction cycle. Agitator motor 33 can be either electrically driven or preferably pneumatically driven.

The resin powder exits from hopper 30 through ports 38 in support plate 34 whenever upper cut-off plate 40 is rotated so that the holes therein are in alignment with the ports 38 of support plate 34. The upper cut-off plate is rotated about its center support by an actuator 41 which is attached to radially extending arm 42 of cut-off plate 40.

FIG. 3 illustrates how the resin powder is permitted to pass through plates 34, 40 and lower support plate 43 into the volumetric weighing cylinders. The volumetric cylinders are comprised of three separate cylinders. Upper cylinders 44 are attached to the bottom of lower support plate 43 and are of such a diameter that they fit telescopically into plastic fine adjustment sleeves 45. Fine adjustment sleeves 45 are, in turn, telescoped into the lower outer tubes 46 which are preferably permanently attached to support plate 50. A set screw 47 is positioned in the side of tube 46 so that it may be biased against the outside of fine adjustment sleeve 45. Volumetric tubes 44 and 46 are made from stainless steel. The use of a plastic sleeve such as 45, interpositioned between tubes 44 and 46, prevents the manufacture of dirt. The tube and sleeve combination is so designed with built-in sealling rings (not shown) that they will effectively seal off the fine powder but will allow sufficient sidewall clearance for vibration transmission. Vibration is utilized to control the rate of discharge from the filled volumetric tubes and will be discussed more in detail at another part of the present specification.

As shown in FIG. 3, the resin powder will completely fill the volumetric weighing chamber created within tubes 44, 46 and sleeve 45. The resin powder is kept from falling through the tubes by bottom cut-off plate 53 which is rotated so that its apertures 51 do not coincide with the bottom of tubes 46. It can be seen that a fine volumetric adjustment can be attained by the vertical positioning of sleeve 45 within tube 46. A clamp screw such as 47 or other constricting band (not shown) can be used to immobilize sleeve 45 in its desired location.

An adjustment for large volumetric charges can be made by moving the entire upper cut-off plate assembly relative to the lower cut-off plate assembly. A chain 60 and sprocket 61 system is connected to, and forms a part of, the upper cut-off plate assembly. By rotating the chain 60, the upper cut-off plate assembly will move either up or down the threaded support posts 62. The rotation of chain 60 can be achieved by the rotation of a single threaded sprocket by, for example, wrench 63. The various plate assemblies heretofore mentioned are easily removed one from the other so that the entire upper assembly can be easily opened up for cleaning or inspection on the bench, with a complete open space available for inspection or cleaning of the bottom cut-off plate assembly. As mentioned above, both top and bottom cut-off plate assemblies are quickly separable for the purpose of cleaning and color change. Two roll pins (not shown) at each corner act to hold the assemblies together as a unit. Quarter turn fasteners (not shown) attached to the upper levels of both cut-off plate assemblies, permit a quick disconnect but maintain clamping pressure between the components of the cut-off plate assemblies to assure consistent operation of the cut-off plates as they are vibrated.

A centrifugal ball-type vibrator 65 is mounted to the top side of the lower level bottom cut-off plate assembly. Vibrator 65 acts primarily in a horizontal direction and vibrates the volumetric tubes as a whole. The degree to which the fine powder is packed in the tubes during volumetric weighing does not facilitate unloading. In order for the unit to perform at its greatest volumetric efficiency, however, a nominal amount of air is removed during volumetric weighing which produces a semi-packed condition. Ball vibrator 65 dispatches the powder from the tube in a shorter time and in some instances breaks up bridging and arching which would prevent any flow whatsoever. The horizontal movement produced by ball vibrator 65 compacts the powder centrally in the tubes 44, 45, loosening adhered powder on the inside diameter, and removes the powder faster than a reciprocating type vibrator.

In order to isolate the vibration from vibrator 65, vibration isolators 66 are utilized to support the lower plate 67 of the bottom cut-off plate assembly. The vibration isolators 66 serve two main purposes. They permit vibratory freedom of the bottom cut-off plate and assembly and also prevent transfer of excessive vibration to the framework 11 and to the hopper 30 where its effect would be harmful.

FIG. 4 is a view part in section and very similar to the view shown in FIG. 3. In FIG. 4, the top cut-off plate 40 has been rotated to the closed position so that additional resin powder cannot enter the volumetric weighing chamber. After the top cut-off plate 40 has been closed, the bottom cut-off plate 53 is rotated to the open position by the action of actuator 68. Actuator 68 acts in a manner similar to actuator 41 and is mounted by suitable means (not shown). The resin powder, aided by the vibratory assist of vibrator 65, falls through flexible delivery tubes 70 and into the compaction block 80. Delivery tubes 70 are attached to a collar 71 which is attached to the bottom side of plate 67. Near the top of flexible tubes 70 is a series of small vents 72. Vents 72, or air holes, permit free air flow for resin powder transfer and subsequent compaction but limit an excessive exchange of air which could possible introduce air-borne dirt to the fine resin powder being compacted.

As the fine resin powder falls through flexible delivery tube 70, it is distributed radially outward upon striking the dispersing cone 81 which is centrally supported in the upper section of compaction chamber 84. Cone 81 is held in position by a support rod 82 which, in turn, is anchored in the lower support ring 83 for flexible tube 70. The resin powder, after being deflected by cone 81, falls into compaction chamber 84 which is a frustum of a right circular cone. As resin powder comes to rest at the bottom of the compaction chamber, it is set up in a non-compacted charge in such a way as to obtain optimum densification at the end of the compacting cycle which will be more fully described hereinafter. The tapered sides of compaction chamber 84 are angled preferably at 15° to the vertical, thus facilitating the ease of removal of the compacted charge 90 from the compaction block 80. The angularity, as expressed above, of the internal wall of chamber 84 provides for additional mechanical strength of the sides of compacted charge 90. As can be seen in FIG. 4, the initial configuration of charge 90 is reniform, or kidney shaped, on the top surface. The low center and higher peripheral crown caused by the dispersing cone 81 sets up the uncompacted resin powder mass for subsequent optimum compaction. As shown at the very bottom of FIG. 4, the uncompacted charge of resin powder rests upon a compacting tray 91.

COMPACTING THE POWDER CHARGE

Directing our attention once again to FIG. 1, compaction block 80 is shown in its position below the measuring portion of the apparatus. Compacting tray 91 is shown removed from the apparatus and with compacted charges 90 contained thereon. A handle 92 is positioned on the front edge of compacting tray 91.

Figure 5:
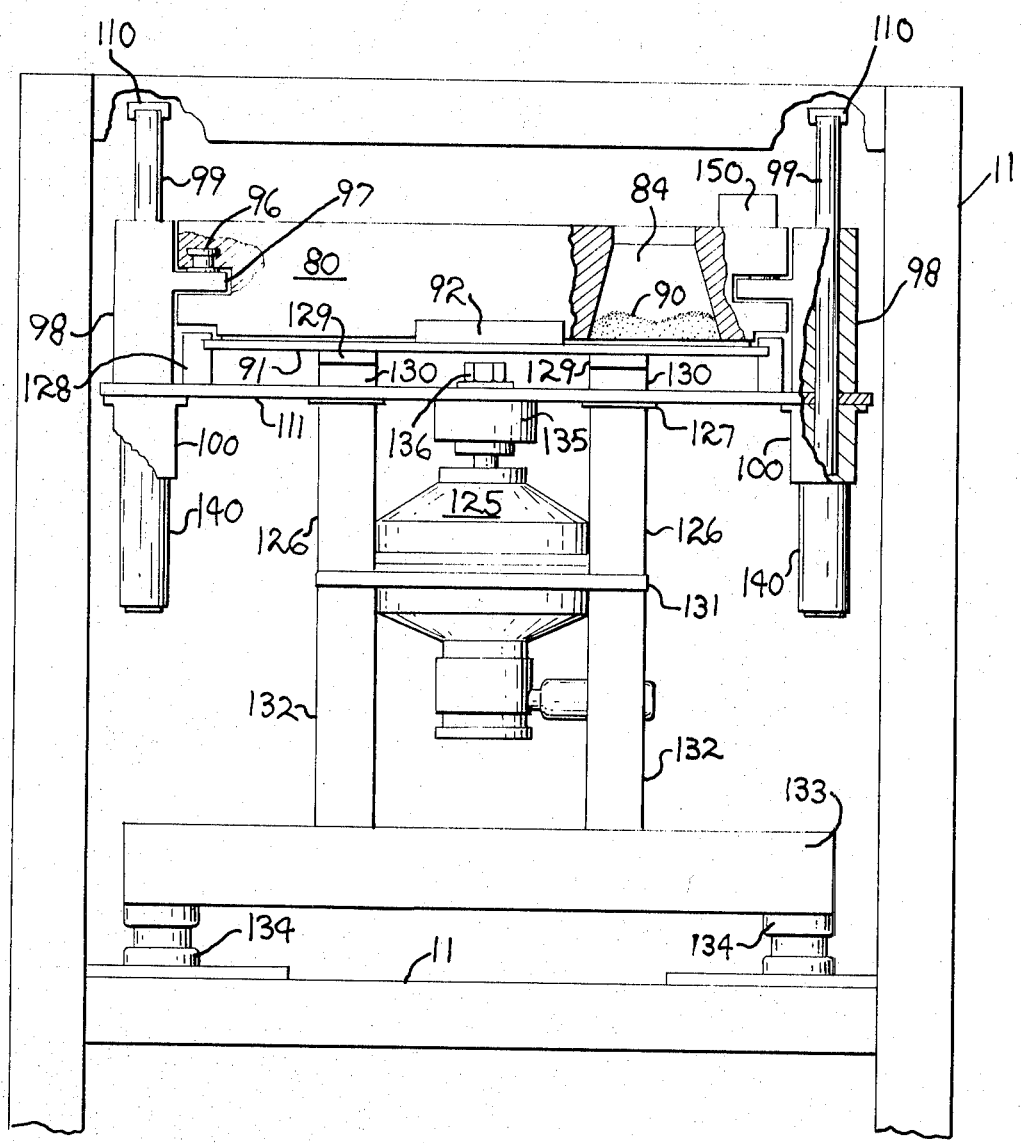
FIG. 5 is a front view, part in section, of vertical vibration and support structure for the compacting chamber.

FIG. 5 is a front view partly broken away and in cross section that shows more fully than FIG. 1 the compacting portion of the present invention. Compacting block 80 is supported at the midpoints 95, see bottom FIG. 2, of both sides by shock mounts 96. Shock mounts 96 are in turn attached to side rails 97 which in turn are fastened to side supports 98. Side supports 98 are movable up and down on slide pins 99 which are anchored at their bottom ends in blocks 100. There are four slide pins 99 in total, and they are stabilized in pairs by channels 110 which are attached at their tops. Thus it can be seen that the entire compacting block can be raised and lowered along slide pins 99.

Blocks 100 which provide the lower support for pins 99 are anchored to the bottom four corners of compacting plate 111. Compacting plate 111 is centrally attached to the top of vibrator 125 which will be commented upon later. In addition to the central attachment, compacting plate 111 is supported at four locations by top posts 126 which form part of the vibration support columns. The tops of posts 126 are not attached to the bottom side of compacting plate 111. A plastic impact cushion 127 is affixed either to the tops of posts 126 or to the bottom side of plate 111. On the top of support plate 111 are attached compacting tray slide bars 128. Slide bars 128 each contain a recess therein for reception of the edges of compacting tray 91. In addition to slide bars 128, compacting tray 91 is further supported by central support bars 129 which are anchored firmly to the top of compacting plate 111 through spacer blocks 130. Also mounted on the bottom of compacting plate 111 are two actuators 140. Actuators 140 are located centrally on the sides of compacting plate 111. (See FIG. 1.) The central extensible actuator rod (not shown) that is contained within actuator 140, extends upwardly through an aperture (not shown) in plate 111 and is anchored to the central span of side support 98.

When the rods of actuators 140 are extended, they move side supports 98 upward along slide pins 99. As slide supports 98 are biased in an upward direction, they carry compacting block 80 in an upward direction away from the top surface of compacting tray 91. Compacting tray 91 is, of course, firmly held in fixed vertical relationship with respect to compacting plate 111.

By extending actuators 140, the compacting block 80 can be raised high enough so that compacting tray 91 and its compacted charges 90 can be removed by grasping handle 92 and pulling the tray forward as shown in FIG. 1. After the compacted charges have been removed from the tray, it can be reinserted whereupon compacting block 80 can be lowered until its bottom surface rests once again lightly on the rather resilient top of compacting tray 91.

To effect the rapid removal of air from the resin powder charges 90 that have been deposited within the confinement of compacting block 80 and upon compacting tray 91, a unique vertical vibrator assembly will now be described. Posts 126 which abut firmly up against the bottom surface of compacting plate 111, rest upon the corners of the mounting plate 131 to which vibrator 125 is attached. Additional support columns 132 extend downward from the underside of vibrator support plate 131 and are anchored firmly on the top surface of compacting base block 133. Compacting base block 133 is quite massive for a purpose which will be explained more fully elsewhere. Compacting base block 133 is mounted upon shock mounts 134 which, in turn, are anchored to framework 11.

Vibrator 125 is of the reciprocating type and is a commercially available item. It consists primarily of top and bottom cylinders with an extensible rod protruding from the top thereof. By alternatingly pressurizing and exhausting the cylinders within the vibrator, its protruding rod can be made to move back and forth. The rod end of vibrator 125 is anchored to the center of compacting base 111 by support 135 and nut 136.

FIG. 6 is a cross-sectional view of support post 126 which is of hollow configuration and which contains a radially inward extending lip 137. Attached to the bottom of compacting base 111 is spring retaining pin 138 which has a flanged end 139. A compression spring 145 is interdisposed between lip 137 and flanged end 139. When the bottom cylinder within vibrator 125 is pressurized, the extensible rod of vibrator 125 will be forced outward and upward thus lifting compacting base 111 to an elevation above the top of supports 126 (see FIG. 7). At this time compression spring 145 is compressed thus allowing a gradual upward movement of the base 111 until the vibrator's limits are reached, at which time the vibrator's bottom cylinder is exhausted and the top cylinder is pressurized. The pressurization of the top cylinder within vibrator 125, assisted by the compression springs 145, drives the base assembly down with an acceleration exceeding that acceleration if the vibrator top cylinder were used alone. The top posts 126 receive the direct compacting shock and deliver it through support columns 132 to compacting base block 133 where it is absorbed, mainly by the inertia of the compacting base block 133. The shock mounts at the four corners of the base block 133 prevent transferal of the shock directly to frame 11.

Thus it can be seen that the resin charges 90 within compacting block 80 are compacted by the upward delivered shock supplied by vibrator 125. The charges 90 are additionally leveled and compacted by the vibration supplied in a horizontal direction by ball vibrator 150 which is mounted on top of compacting block 80. Vibrator 150 accomplishes three things: it begins to densify the charge centrally drawing resin powder from the periphery of charge 90 where it was first distributed by cone 81; it establishes a clearance about the periphery of charge 90 for ease in block removal; and it shifts laterally the strata of charge 90 thus increasing the rate at which the entrained air is removed. The two shock mounts 96, one on either side of compacting block 80, permit vibratory freedom of the compacting block during the time which vibrator 150 is operating. At the end of the vertical and horizontal vibration cycle, an evenly compacted and leveled charge 90 is produced with sides angled at approximately 15°. The charge 90 has a very uniform compression strength that is approximately as strong about the periphery in compression as at the center. The charge 90 is then able to withstand a certain amount of mechanical abuse and shock in its transfer from the compacting tray.

FIG. 8 is an exploded side view of compacting tray 91. Tray 91 is made by securing a plurality of sheets of muslin 160, 120 to 200 mesh, secured around an aluminum retaining plate 161 which, in turn, is mounted on tray 91 by suitable fasteners such as screws 162. By equipping tray 91 with a plurality of muslin layers, the following advantages are obtained. Pathways are provided for the escape of water vapor and formaldehyde products associated with preheating. The muslin provides a reasonably durable and dense surface upon which the fine resin powder can be compacted. The surface facilitates compacted and preheated charge removal. The proper degree of insulation is provided in order to obtain an evenly preheated charge. The muslin surface readily lends itself to cleaning with a vacuum-type cleaner.

METHOD OF OPERATION

Having discussed in detail the various individual operations of the resin powder volumetric and measuring apparatus 10, it is now possible to see the interrelation of each function as a complete cycle of the operation is traversed.

The compacting block 80 is in the up position, having been raised by actuators 140. The top cut-off plate 40 is in the open position and the bottom cut-off plate 53 is closed. Start button 170 (FIG. 1, upper right) is pushed, thus starting the cycle which is controlled by computer 180 which is located on the bottom structure of framework 11. Compacting block 80 moves down so that its bottom surface rests snugly against the muslin top surface of compacting tray 91. The top cut-off plate 40 is closed; the bottom cut-off plate is opened and the resin powder begins to move downward under the influence of the horizontal vibration of ball-type vibrator 65 which operates for five to seven seconds at approximately 16,000 vibrations per minute. The top and bottom cut-off plates return to the load position. Reversible motor 33 begins its oscillatory movement thus driving paddles 35 and 36 back and forth to assure complete filling of the volumetric weighing chambers. The resin powder which has been discharged from the weighing tubes is now resting on top of tray 91 and within the confinement of compacting block 80 which is vibrated in the vertical direction by vibrator 125 which operates at approximately 180 strokes per minute at an amplitude of nearly an inch. Simultaneously with the vertical vibration, compacting block 80 is vibrated in a horizontal direction by ball-type vibrator 150 which operates at approximately 8,000 vibrations per minute. The compaction cycle ends, the reversible motor 33 stops, the compacting block 80 moves up and tray 91 is removed manually with its plurality of compacted charges 90. The tray and contents are placed in an R.F. type heater and the compacted charges 90 are preheated. Upon removal from the preheater, charges 90 are removed from tray 91 and placed in a press for molding to final configuration. The muslin top of tray 91 is then vacuum cleaned and reinserted into apparatus 10 for another cycle. While almost all of the functions above set forth are controlled by computer 180, apparatus 10 has two operations that can be controlled manually. The reversible motor 33 can be run at will to insure complete filling of the volumetric weighing tubes at the beginning of a run or at drum changes and the compaction block 80 can be raised or lowered at will. Control buttons for these operations are located at 180 (FIG. 1).

FIG. 9 is a schematic elevational view shown part in section which shows compacting tray 91 and the compacted resin powder charges 90 contained on the top surface thereof. Shown just above the charges 90 on tray 91 are telescoping enclosures 185. Enclosures 185 are fabricated from two tubular parts 186 and 187. Tubular parts 186 and 187 are adjustable one within the other in an axial direction and can be immobilized at any particular height by a set screw 188. The tubular parts are made from a non-metallic material such as polyethylene. The top of tubular part 186 is affixed to a non-metallic support plate 189. Plate 189 can be fabricated from a material such as silicone fiber glass board. While two enclosures have been shown mounted to support plate 189, it is apparent that any number of enclosures can be mounted depending upon the number of charges that are being volumetrically weighed and dispensed by apparatus 10. Support plate 189 is suspended from the lower bar 190 of a raising and lowering mechanism by vertical rods 191. An actuator 192 is mounted from a suitable support structure (not shown). The movable rod 193 of actuator 192 is connected to an endless chain 194 which is trained over sprockets 195. Sprockets 195 are fixed to rotatable shafts 196 which are journalled to lower bar 190. Cam members 197 are positioned so that the cam followers 198 can move over their surface when actuator 192 is activated. Thus it can be seen that enclosures 185 can be raised and lowered over charges 90 on tray 91.

The telescoping enclosures 185 prevent excessive heat transfer by radiation and convection. It appears to define, in an unexplained manner, the area in which the electrical field lines of force are applied during R.F. preheating of the compacted charges. This effect is particularly noticeable in the peripheral area of the compacted charge. In addition to producing a more evenly preheated charge, the enclosure also accomplishes the delivery of a cleaner charge.

While certain representative embodiments and details have been shown for the purpose of illustrating the invention, it will be apparent to those skilled in this art that various changes and modifications may be made therein without departing from the spirit or scope of the invention.

What is claimed is:

1. An apparatus for compacting a thermosetting particulate material, said apparatus comprising:
   upright frame means;
   a detachable material containing means having controlled outlet means through which particulate material is adapted to gravitate;
   material dispersion means adapted to receive the particulate material from said material containing means and translate it by the action of an array of paddles, capable of an oscillatory movement, to a plurality of apertures;
   means to receive the material from said material dispersion means and volumetrically weigh it;
   means to selectively vibrate the material as it is moved from the confinement of said volumetric weighing means;
   material compaction means adapted to receive the volumetrically weighed material;
   means to selectively vibrate said compaction means in a horizontal direction with a high frequency low amplitude vibration;
   vibrator means and energy storing means attached to and positioned between said material compaction means and an inertia block to selectively and independently vibrate said compaction means with a gradual upward movement and a rapid downward movement simultaneously along with a horizontal vibration; and
   means to remove the compacted material from the confinement of said compaction means.

2. An apparatus for compacting a melamine powder material, said apparatus comprising:
   upright frame means;
   a detachable material containing means having controlled outlet means through which powdered material is adapted to gravitate;
   material dispersion means adapted to receive the particulate material from said material containing means and translate it by the action of an array of paddles, capable of an oscillatory movement, said paddles having at least two different configurations and positioned at at least two different levels;

means adapted to receive the powdered material from said material dispersion means and volumetrically weigh it;

means positioned so as to control the ingress of powdered material into said weighing means;

means positioned so as to control the egress of powder material out of said weighing means;

means positioned exteriorly of said weighing means to selectively vary the volume thereof;

means attached to said weighing means and adapted to selectively vibrate the material as it is moved from the confinement of said volumetric weighing means;

flexible powder material conveying means adapted to convey said material to compaction means;

material compaction means adapted to receive the volumetrically weighed material;

means provided within said compacting means to direct the gravitating powdered material into an uncompacted mass that has a top cross-sectional profile of reniform configuration;

means adapted to selectively and independently vibrate said compaction means in a vertical direction with a low frequency high amplitude vibration simultaneously along with said horizontal vibration;

means provided to store the energy on the upward stroke of said vertical vibration means and deliver the stored energy to said compaction means on the downward stroke; and means adapted to move the material compaction means in an upward direction from the compacted powdered material.

3. An apparatus as claimed in claim 2 wherein means are provided to absorb the inertial reaction effect of said vertical vibration means.

4. An apparatus as claimed in claim 2 wherein computer means are provided to operate said apparatus in timed sequential operative steps.

5. An apparatus as claimed in claim 2 wherein means are provided to support said powdered material while it is being compacted and for its removal from said apparatus.

References Cited

UNITED STATES PATENTS

| | | | |
|---|---|---|---|
| 2,099,265 | 11/1937 | Freyssinet | 25—103UX |
| 2,136,009 | 11/1938 | Holland | 25—103UX |
| 2,549,642 | 4/1951 | Seelig | 25—41JX |
| 2,579,527 | 12/1951 | Weyerhaeuser | 18—30GHX |
| 2,581,579 | 1/1952 | Davis | 25—41J |
| 2,695,523 | 11/1954 | Oswalt | 25—41JX |
| 2,815,535 | 12/1957 | Bodine | 25—41JX |
| 2,859,502 | 11/1958 | Brown | 25—41J |
| 2,979,799 | 4/1961 | Decker | 25—103X |
| 3,050,809 | 8/1962 | Kupka | 25—41JX |
| 3,052,919 | 9/1962 | Rayburn | 18—16F |
| 3,076,229 | 2/1963 | Arpajian | 25—103X |
| 3,081,492 | 3/1963 | Grzegorczyk | 25—103X |
| 3,129,463 | 4/1964 | Gill et al. | 25—41JX |
| 3,273,217 | 9/1966 | Chanlund | 25—41J |
| 3,298,065 | 1/1967 | Pendleton | 25—41JUX |

FOREIGN PATENTS

| | | | |
|---|---|---|---|
| 736,662 | 9/1955 | Great Britain | 18—30GR |
| 103,117 | 11/1941 | Sweden | 18—30GR |

J. HOWARD FLINT, JR., Primary Examiner

U.S. Cl. X.R.

18—30; 25—41J, 103; 264—71